Patented Feb. 23, 1943

2,311,656

UNITED STATES PATENT OFFICE 2,311,656

RUBBER DERIVATIVE AND METHOD OF MAKING SAME

Thomas Raymond Griffith, Ottawa, Ontario, Canada, assignor to The Honorary Advisory Council for Scientific and Industrial Research, Ottawa, Ontario, Canada, a corporation of Canada No Drawing. Application June 2, 1939, Serial No. 277,086

12 Claims. (Cl. 260—768)

This application is a continuation in part of my co-pending application Serial No. 214,666, filed June 20, 1938, and the invention relates to rubber derivatives and a process for making the same, and, in particular, to rubber derivatives suitable for bonding rubber to metal and other surfaces, and as a basis for coating compositions, as paints, varnishes, and coatings. It also relates to a process for bonding rubber to metal, fabric, solids, and the like.

Several methods have been developed for bonding rubber to metal, but because of the complicated procedure involved, or because of the characteristics and strength of the bond produced, these methods are frequently unsatisfactory. Some methods require the adhesive cement coating for bonding rubber to metal to be heated under accurately controlled conditions to modify it before the rubber is vulcanized thereon. In other methods a thermoplastic adhesive is used, and the mold must be cooled before the rubber and metal assembly is removed.

It is, therefore, an object of this invention to provide a simplified method for firmly uniting rubber to metal and other materials, wherein the assembly may be removed hot from the mold without destroying the strength of the union.

It is another object of this invention to provide rubber derivatives, and a process for making the same, which derivatives may be used to form a bond of improved strength between rubber and metal or the like.

It is a further object of this invention to provide an adhesive, and a method for producing the same, which possesses excellent aging qualities and relatively high bonding strength at elevated temperatures.

It is a still further object of this invention to provide a rubber derivative having superior aging properties and substantial solubility in rubber solvents, and which, when suitably compounded, may be used as a protective coating having relatively high resistance to atmospheric conditions.

The improved rubber derivatives of this invention are prepared by milling sulfur or equivalent rubber vulcanizing agents, such as selenium, vulcanizing types of accelerators, etc., and one or more suitable conversion reagents, into rubber, such as Hevea smoked sheet, or pale crepe, sheeting the product out to relatively thin sheets, heating the sheets under suitable conditions until the desired reaction takes place, and then masticating the product to render it soluble in rubber solvents. To obtain the improved rubber derivative of this invention the sulfur must be chemically combined in the resulting rubber derivative in rather definite proportions. Suitable rubber accelerators may be added to the mix, if desired.

The properties of the rubber derivative produced depend to a large extent on the conversion reagent used in its formation, certain reagents giving adhesives having considerably improved properties. Conversion reagents which give products with good properties have been found to be, in general, mixtures of one or more salts of a strong acid with a weakly acidic substance. These compounds are considered to have an oxidizing action on rubber when mixed with weak acids, that is, they reduce the number of double bonds present in the derivative. The character of the rubber derivative produced seems to be improved when both of the ingredients are solids and may be further improved when one or more of the solid substances contains considerable water of crystallization. The sulfates, and, in particular, the acid sulfates, are preferred, especially when they contain considerable water of hydration. For best results, these materials are used with a suitable cooperating ingredient, such as a weakly acidic substance. Aluminum acid sulfate, when properly used with a cooperating material of the character of phosphoric acid, produces rubber derivatives having exceptionally desirable properties for use both as an adhesive and as a basis for paints.

Examples of the acid sulfates which are particularly desirable for use are acid sulfates of aluminum, iron (both ferric and ferrous), alkali metals, including ammonia, alkaline earth metals, the closely related alums, potassium alum and other alums. In addition to the acid sulfates, certain sulfates may be used advantageously. Examples of these are sulfates of iron (both ferric and ferrous), copper, mercury, and cadmium. Examples of salts of strong acids other than sulphuric acid are bromides of mercury and zinc, chlorides of mercury, tin and aluminum, and alkali metal iodides. Phosphoric acid is a very good example of a weakly acidic substance desirable for use in forming the rubber conversion product hereinbefore mentioned. For some uses, where it is desirable to have the conversion product somewhat more soluble in rubber solvents, oxalic acid has been used advantageously. Other weak acids that are also desirable for use are benzoic, tartaric, phthalic and salicylic. The particular acid may be selected for the properties it gives to the conversion product, as various acids seem to impart slightly different properties.

These weakly acidic materials, while assisting in the formation of the rubber derivatives, are not absolutely essential ingredients of the conversion reagents, and may, in some cases, be omitted. The quantity of salts of strong acids required to convert the rubber into the derivative is, however, much larger when the weakly acidic compound is omitted as a part of the conversion reagent. Thus, the rubber derivative may be prepared by using aluminum acid sulfate alone as the conversion reagent, but its properties as an adhesive are improved and the quantity of reagents required is decreased when phosphoric acid is also present.

It is to be noted that the phosphoric anhydride, $P_2O_5$, may be used in place of the phosphoric acid if some water is present in the conversion reagent mixture. In the cases of the other weak acids, if the anhydride is readily available it may be used, provided a small amount of water is present in the mixture.

In the preparation of the rubber derivatives, the conversion reagents, sulfur, and, if desirable, an accelerator, are mixed or milled into the rubber until the ingredients are thoroughly incorporated. Ordinarily there should be present in the mix, before heating, from about 3% to 15% of water, which includes water of crystallization and/or free water which is preferably added during the mixing. The amount of total water may vary outside of and beyond these limits for the production of materials with desired specific properties. The so mixed product is preferably formed into relatively thin section, such as relatively thin sheets, of an appropriate thickness of about 2 or 3 mm. or so, which are placed in an oven with temperature control and heated for an appropriate period. During the heating, an exothermic reaction takes place, and, to obtain the most desirable properties, it is essential that the temperature in the sheets does not rise substantially higher than 170° C., and it is desirable to keep the temperature of the material as low as possible and yet obtain reaction within a reasonable time. This is obtained by utilizing sheets of 2 or 3 mm. in thickness. Also, evaporation of the water contained in the sheet serves to keep the temperature down. If desired, an inert gas or air may be circulated over the sheeted material in the oven. It is preferred, however, to heat the material in a relatively high vacuum, such as about 500 mm. or more, of mercury. By carrying out the reaction in a vacuum or an inert gas, the tendency for portions of the thin sheets to become harder than others is substantially eliminated, and a more uniform product is obtained.

By the use of very thin sheets, such as 1 mm. or so, in thickness, it is possible to carry on the reaction at temperatures as low as 100° C. to 105° C., and a derivative having higher molecular weight is produced, which is relatively less soluble. The formation of the material in thin section is important in facilitating the reaction, it being found that the reaction takes place with difficulty when relatively thick sheets are used.

The sheeted material is heated for a sufficient time to allow the reaction to progress to the desired state. A somewhat harder product is produced by heating a given mixture for a longer period of time. After heating, the material is substantially insoluble in rubber solvents, but solubility may be restored by masticating the material for a sufficient time on a rubber mill or in a suitable mixer, if the molecular weight of the product is not too high.

The quantity of conversion reagent used in forming the rubber derivative is dependent on the character of the derivative desired and the conversion reagent used. Larger quantities of conversion reagent, such as aluminum acid sulfate with phosphoric acid, give harder products when heated for a given length of time. When a weakly acidic compound is not present, a larger quantity of the acid salt of strong acid must be used, and this may amount to 50% or more of the rubber mixture. When a weak acid, such as phosphoric, is also present, the total of both ingredients of the conversion reagent may, in some cases, be less than 10% of the rubber mixture.

The sulfur greatly improves the strength and aging properties of the adhesive material at elevated temperatures, and improves the color and resistance of paint films containing the derivative. The improvement in the properties of the derivative is very noticeable, even when small percentages, such as .1%, are used, and, when more than about 3% or so of sulfur is present, the derivatives tend to be insoluble, and the solubility is not restored by milling or mastication. Hence, rubber derivatives having more than about 3% combined sulfur are unsuitable for many uses. The effect of sulfur on the solubility of the rubber derivatives is greater with the softer material than with the harder materials; thus, a smaller quantity of sulfur than 3% may render a soft derivative insoluble. It is preferred to use the maximum amount of sulfur in the product commensurate with the solubility desired.

The improved rubber derivatives, having the same properties as above, may also be prepared by adding sulfur, or its equivalent, to the hydrocarbon conversion products obtained by mixing or milling a conversion reagent, such as those mentioned, into the rubber, sheeting, and heating, as above described, but without sulfur being present. When the sulfur is added to this hydrocarbon conversion product it is thoroughly mixed therewith, and, if desired, an accelerator is added and the mixture heated to vulcanizing temperature, to insure combination of the sulfur with the hydrocarbon obtained from the rubber.

The sulfur may be added as elemental sulfur, in the usual manner, to the rubber mix, or to the conversion product, or it may be added in the form of a vulcanizing type of accelerator, such as tetramethylthiuramdisulfide, etc. If the amount of combined sulfur is greater than is commensurate with the required solubility, it has been found that the required solubility may usually be restored by milling the sulfur-containing rubber derivative with sufficient of a more soluble conversion product, which results in a decrease in the percentage of sulfur present and lowering of the viscosity of resulting solutions. Thus, for example, the hard, insoluble rubber derivative containing 4% of sulfur may be solubilized by milling it either with an equal quantity of a derivative having 1% to 2% of sulfur, or ⅓ its weight of a conversion product having no sulfur, to produce a product having less than 3% of combined sulfur. If a soft rubber derivative is desired, the maximum of sulfur chemically combined in the rubber derivative commensurate with requisite solubility may be about 2% or so, but the same characteristics as to solubilizing prevail.

The characteristics of the derivatives produced are also somewhat dependent on the rubber used as a starting material, and the strongest adhesive is produced from rubber such as pale crepe, smoked sheet, etc. Masticated rubber may, however, be used as a basis for preparation of the derivative, but it is desirable that the amount of mastication be kept at a minimum value for the making of adhesives. Other rubber-like materials, such as reclaim rubber and African or Congo rubber, may be used for the production of rubber derivatives of the type herein disclosed.

The following examples, in which the parts are by weight, illustrate the preparation of the rubber derivatives:

Example 1

| | |
|---|---|
| Rubber | 100 |
| Acidified aluminum sulfate | 100 |
| Sulfur | 3 |
| Accelerator (tetramethylthiuramdisulfide) | 2 |

These ingredients are thoroughly mixed on a rubber mill, sheeted to about 2.5 mm., heated at 150° C., for a couple of hours, and masticated to render the material soluble in rubber solvents.

When phosphorus pentoxide is added to the above, the amount of acid aluminum sulfate may be decreased substantially, and improved material is produced.

Example 2

A conversion product was prepared by intimately mixing 100 parts of rubber, 12 parts of aluminum acid sulfate, 3 parts of $P_2O_5$, and 1 part of water on a rubber mill. The material was sheeted out and heated as above. 100 parts of the conversion product thus produced were milled with 1.5 parts of sulfur and .5 part of Captax (mercaptobenzothiazol) heated at vulcanizing temperature to produce the sulfur-containing rubber derivative, and masticated to render it soluble. It may be dissolved in suitable rubber solvents and used as an adhesive, or it may be mixed with suitable solvents, fillers and oils to produce coatings or paints.

If the derivative is to be used for the production of paints, it should preferably be of the harder type and masticated a relatively longer time to increase its solubility. The sulfur combines with the rubber conversion product and the resulting compound may be considered to have substantially the molecular formula $R_xA_y$, where R is a hydrocarbon derived from rubber, A is one of the group consisting of sulfur, selenium, and tellurium, $x$ and $y$ having numerical values.

During the first mastication after the exothermic reaction has taken place, it is desirable to remove or neutralize any acid constituents that may be present. This may be accomplished by washing the material and/or by adding a compound such as oxides or carbonates of magnesium, zinc, etc.

Any of the heretofore named conversion reagents may be substituted for the aluminum acid sulfate and $P_2O_5$ in the above examples to produce rubber conversion products. The derivatives produced with aluminum acid sulfate, alkali metal sulfates, or the alums, together with phosphoric acid, produce rubber conversion products having desirable properties for preparation of adhesives which give relatively strong, heat resistant bonds between rubber and other surfaces.

The following examples illustrate the preparation of adhesives giving strong bonds:

Example 3

| | |
|---|---|
| Rubber (pale crepe) | 100 |
| Phosphorus pentoxide ($P_2O_5$) | 4.5 |
| Acidified aluminum sulfate ($Al_2(SO_4)_3.H_2SO_4.3H_2O$ + $Al_2(SO_4)_3.18H_2O$) | 18 |
| Water | 2 |
| Sulfur | 3 |

These ingredients were thoroughly mixed together on a rubber mill, sheeted to about 2 or 3 mm. thickness or less, heated in vacuum for 2 hours at 150° C. This material is relatively hard and was solubilized by milling, mixed with 10 parts of zinc oxide, 30 parts carbon black, and 2 parts of an antioxidant, and dissolved in an appropriate solvent to produce an adhesive.

Example 4

| | |
|---|---|
| Rubber (pale crepe) | 100 |
| Acidified aluminum sulfate | 9 |
| Phosphorus pentoxide | 2.4 |
| Water | 1 |
| Sulfur | 1.5 |

These ingredients were mixed as in Example 1, heated for 85 minutes at 150° C. in vacuum. This material is softer than that produced in Example 3. It is compounded with 80 parts of zinc oxide and 2 parts of an antioxidant after which it is further milled for 30 minutes to render it completely soluble in rubber solvents.

In the preparation of assemblies wherein rubber is vulcanized or bonded to metal or the like, a strong bond may be produced by the following procedure:

The metal is first coated with a solution of a harder rubber derivative such as that of Example 3, and then with a solution of a softer derivative such as that of Example 4 after the previous coat has dried. One or more coats of each derivative may be applied but the harder derivative is put adjacent the metal and the softer derivative is superimposed on the harder derivative. The rubber to be bonded to the metal may now be applied and vulcanized directly thereto, a strong bond being produced.

It is preferable, however, to apply what is commonly termed a tie cement which may be formed by mixing 100 parts of rubber with suitable compounding ingredients, such as about 40 parts of carbon black, 20 parts short fibre asbestos, 1.25 parts stearic acid, 5 parts zinc oxide, with or without vulcanizing agents and antioxidants, and dissolving the compounded rubber in suitable solvents.

A suitable sample of metal was coated successively with the adhesives of Examples 3, 4, and the tie cement above, each coat being allowed to dry before the next was applied. The coated metal was placed in contact with vulcanizable rubber and the assembly heated in a suitable mold under pressure. This assembly was removed from the hot mold. The strength of the bond at room temperature was 800 lbs. per square inch and 200 lbs. per square inch at 100° C. When the sulfur was omitted from the above examples the conversion product and adhesive being otherwise identical, the strength of the bond produced as above was 775 lbs. per square inch at room temperature and about 175 lbs. per square inch at 100° C.

The suitability of an adhesive for uniting rubber to metal and the like is determined to a large extent by the plasticity of the material at elevated temperatures. The plasticity of the material may be measured by subjecting it to compression under a suitable stress such as one kilogram per square centimeter, measuring the deformation, then releasing the stress on the material and measuring its recovery. A higher ratio of recovery to deformation indicates the superior product which has less plasticity. The rubber derivatives produced according to this invention and particularly those produced when an aluminum acid sulfate and $P_2O_5$ is used as the conversion reagent, have less deformation than rubber and are less plastic than rubber at elevated temperatures. Thus, a derivative produced with aluminum acid sulfate and $P_2O_5$ as in the above examples gave a recovery to deformation ratio of .80 at 120° C., whereas the ratio of recovery to deformation of pale crepe rubber is but .5 under similar conditions. Hydrocarbons derived from rubber by the treatment with conversion reagents together with heating as above set forth have the same unit empirical formula as rubber, namely $C_5H_8$, the number of these groups in one molecule being unknown, and the unit hydrocarbon R has less unsaturation than rubber, as evidenced by the iodine values.

The rubber derivatives produced as above described are dissolved in a suitable solvent to produce adhesives suitable for bonding rubber to metal. These adhesives have improved temperature resistance and aging qualities and provide for the formation of rubber to metal bonds having increased strength at elevated and ordinary temperatures. In the production of paints and the like the derivatives are dissolved in suitable solvents, and mixed with the desired pigments, oils, etc.

The rubber conversion product containing sulfur in combination and produced according to the invention herein is particularly suitable for the making of adhesives. Bonds made between rubber and metal and between rubber and other solids with adhesives made and applied according to this invention have relatively high strength, are not thermoplastic, and are heat resistant. It has also been found that the rubber derivatives of this invention, when properly compounded with suitable pigments, etc., produce coating compositions and paints which adhere well and are very stable.

The term "unmelted . . . rubber derivative" as used herein includes only those derivatives which have not been and are not melted.

It is obvious that various modifications may be made in the above described process without departing from the principles of the invention herein set forth, and it is my intention not to limit the appended claims except as may be necessitated by the prior art.

What I claim is:

1. A relatively uniform, unmelted, soluble, solid, masticated homogeneous heat reaction product formed by heating in vacuum a relatively thin sheet of a mixture of unvulcanized rubber, a salt of a strong acid, a weak acid, and less than 3% sulphur.

2. A method for producing soluble, unmelted, solid rubber derivatives which are less plastic than rubber at temperatures around 100° C. and which contain a vulcanizing agent combined therewith, which comprises forming an intimate mixture of a member of the group consisting of sulfur, selenium and tellurium with a solid, relatively non-volatile salt of a strong acid, rubber, water, including water of crystallization, and a weakly acidic substance, forming the mixture into thin sections having at least one dimension not substantially greater than 5 mm., heating the formed mix to a temperature between about 100° C. and about 170° C. to procure an exothermic reaction product, and masticating the product to confer solubility in solvents for rubber.

3. A method for producing soluble, unmelted, solid rubber derivatives, containing a vulcanizing agent combined therewith, which are less plastic than rubber at elevated temperatures, which comprises forming an intimate mixture of sulfur, a solid inorganic salt of a strong acid, crude rubber, water, including water of crystallization, and a weakly acidic substance, forming the mixture into thin sections having at least one dimension not substantially greater than 5 mm., and heating the formed mix to a temperature of between about 100° C. and 170° C. to procure an exothermic reaction product, said sulfur not exceeding substantially 3% of the weight of said rubber.

4. A method for producing soluble, solid, unmelted rubber derivatives containing a vulcanizing agent combined therewith, which comprises forming an intimate mixture of selenium with a solid, non-volatile, inorganic metal salt of a strong acid, unvulcanized rubber, water, including water of crystallization, and a weakly acidic substance, forming the mixture into thin sections having at least one dimension not substantially greater than 5 mm., heating the formed mix to a temperature of between about 100° C. and about 170° C. to procure an exothermic reaction product, and masticating the product sufficiently to confer solubility.

5. A solid, substantially homogeneous, unmelted derivative of solid rubber which is soluble in rubber solvents derived from petroleum and which is characterized in dissolved form by being suitable for adhering rubber to metal, said derivative having the same carbon to hydrogen ratio as rubber and containing in combined form a vulcanizing element for rubber selected from the group consisting of sulfur, selenium and tellurium, said rubber derivative being further characterized by having less plasticity than pale crepe rubber at temperatures of the order of 100° C. and by being a masticated heat reaction product of a mixture of solid rubber, a salt of a strong acid, a vulcanizing element and a weakly acidic substance, the amount of said element chemically combined in said derivative being not substantially greater than 3%.

6. A relatively uniform, unmelted, solid, masticated, homogeneous heat reaction product formed by heating in an atmosphere having less oxygen pressure than does air a relatively thin sheet of a mixture containing solid rubber, a salt of a strong acid, a weak acid and less than about 3% of sulfur, said masticated heat reaction product being soluble in petroleum solvents for rubber.

7. A solid, unmelted, masticated derivative of solid rubber containing combined sulfur and having the same carbon to hydrogen ratio as rubber, said derivative being obtained by heating in a form having thin section, a previously undissolved mixture of solid rubber, water, including water of crystallization, a metal salt of a strong acid, a weak acid and sulfur to procure a reaction, and masticating the product to solubilize it in petroleum solvents for rubber, the amount of sulfur chemically combined with said derivative being less than 3%.

8. A method of producing soluble, unmelted, solid, rubber derivatives, which comprises intimately mixing sulfur, a metal sulfate and water, including water of crystallization, with solid rubber, forming the mixture into relatively thin section having at least one dimension not greater than about 5 mm., heating the mixture to about 100° C. to initiate a reaction, and masticating the product to render it soluble in petroleum solvents for rubber, the amount of said sulfur chemically combined with said derivatives being not more than 3%.

9. A substantially homogeneous, unmelted, solid, cyclized rubber derivative obtained by heating rubber with a catalyst comprising a salt of a strong acid and water, and characterized by having less plasticity than pale crepe at temperatures of about 100° C., by containing sulfur in an amount up to 3% and, after mastication, by being soluble in petroleum solvents for rubber.

10. A homogeneous, unmelted, solid derivative of solid rubber which, after mastication, is soluble in rubber solvents and which is the heat reaction product in a section having a thickness not substantially greater than 5 mm. of a mixture comprising essentially solid rubber, a relatively non-volatile acid salt of a strong acid and water, and up to 3% of sulfur.

11. A homogeneous, unmelted solid derivative of solid rubber which, after mastication, is soluble in petroleum solvents for rubber, and which is the heat reaction product in a section having a thickness not substantially greater than 5 mm. of a mixture comprising essentially solid rubber, aluminum sulfate, phosphorus pentoxide and up to 3% of a member of the group consisting of sulfur, selenium and tellurium.

12. A homogeneous, unmelted, solid derivative of solid rubber which, after mastication, is soluble in petroleum solvents for rubber, and which is the heat reaction product in a section having a thickness not substantially greater than 5 mm. of a mixture comprising essentially solid rubber, acid aluminum sulfate, water, and less than 3% of sulfur.

THOMAS RAYMOND GRIFFITH.